(12) United States Patent
Isaly et al.

(10) Patent No.: US 12,556,896 B2
(45) Date of Patent: Feb. 17, 2026

(54) CACHING A DATA PAYLOAD ON A PERIPHERAL DEVICE FOR DELIVERY TO A TARGET DEVICE

(71) Applicant: INTERNATIONAL BUSINESS MACHINES CORPORATION, Armonk, NY (US)

(72) Inventors: Alexandra M. Isaly, Lighthouse Point, FL (US); Wesley Ip, Arlington, TX (US); Zachary A. Silverstein, Georgetown, TX (US); Logan Bailey, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 18/297,283

(22) Filed: Apr. 7, 2023

(65) Prior Publication Data

US 2024/0340624 A1    Oct. 10, 2024

(51) Int. Cl.
*H04W 4/80* (2018.01)
*H04B 5/72* (2024.01)
(Continued)

(52) U.S. Cl.
CPC ............... *H04W 4/80* (2018.02); *H04B 5/72* (2024.01); *H04L 49/9042* (2013.01); *H04W 76/14* (2018.02)

(58) Field of Classification Search
CPC .......... H04W 4/80; H04W 76/14; H04B 5/72; H04L 49/9042; H04L 67/568;
(Continued)

(56) References Cited

U.S. PATENT DOCUMENTS 7,606,530 B1   10/2009  Anderson
10,609,643 B1   3/2020  Le
(Continued)

FOREIGN PATENT DOCUMENTS

JP    5521577 B2    6/2014

OTHER PUBLICATIONS

"IBM Makes NFC Based 2-Factor Security for Mobile Transactions," https://rfidworld.ca/ibm-makes-nfc-based-2-factor-security-for-mobile-transactions/1764, downloaded from the internet Feb. 21, 2023, 2 pages.
(Continued)

*Primary Examiner* — Cindy Trandai
(74) *Attorney, Agent, or Firm* — Eric W. Chesley

(57) ABSTRACT

Described are techniques for caching a data payload on a peripheral device for delivery to a target device. The techniques include receiving, at a peripheral device via a short-range wireless protocol, a data payload intended for a target device, where the data payload is received from a source device configured to send the data payload to the target device. The techniques further include storing the data payload in a memory of the peripheral device for a time that allows the peripheral device to be placed in network proximity of the target device and transfer the data payload from the peripheral device to the target device. The techniques further include detecting the target device via a short-range wireless network, and sending the data payload to the target device via a short-range wireless protocol used by the target device.

20 Claims, 4 Drawing Sheets

(51) Int. Cl.
*H04L 49/90* (2022.01)
*H04W 76/14* (2018.01)

(58) Field of Classification Search
CPC ..... H04L 69/18; H04L 67/12; G06Q 20/3274; G06Q 10/02; G06Q 20/3224; G06Q 20/3278; G06Q 20/0457; G07C 9/00817; G07C 2009/00841
See application file for complete search history.

(56) References Cited

U.S. PATENT DOCUMENTS

| | | | |
|---|---|---|---|
| 11,238,683 B1 | 2/2022 | Mars | |
| 11,539,522 B2 | 12/2022 | Mars | |
| 12,035,191 B2* | 7/2024 | Cui | H04W 36/0058 |
| 12,333,521 B2* | 6/2025 | Markh | G06Q 20/4015 |
| 2012/0187184 A1* | 7/2012 | Challa | G06K 19/06112 |
| | | | 235/375 |
| 2015/0372746 A1* | 12/2015 | Xie | H04W 4/80 |
| | | | 455/11.1 |
| 2017/0180921 A1* | 6/2017 | Pelochino | H04B 1/385 |
| 2019/0184093 A1* | 6/2019 | Sjolund | A61B 5/7455 |
| 2020/0012798 A1* | 1/2020 | Shankar | G06F 21/335 |
| 2020/0074356 A1* | 3/2020 | Tseng | G06Q 20/045 |
| 2021/0027273 A1* | 1/2021 | Bhuptani | G06Q 20/0457 |
| 2021/0243599 A1* | 8/2021 | Lee | H04L 9/30 |
| 2021/0350341 A1* | 11/2021 | Song | G06Q 20/0457 |
| 2022/0201102 A1 | 6/2022 | Minaburo | |
| 2022/0279542 A1* | 9/2022 | Elshafie | H04W 72/1263 |
| 2023/0239137 A1* | 7/2023 | Diaz | G06K 19/06037 |
| | | | 380/28 |
| 2023/0368323 A1* | 11/2023 | Komagome | G06Q 20/3274 |

OTHER PUBLICATIONS

"NFC—A World of Opportunities," www.st.com, Jul. 2022, 36 pages, United Kingdom.

Bhanushali, J. et al.; "Internet of Things: Machine to Machine communication with emphasis on role of RFID and NFC," International Journal of Scientific & Engineering Research, Nov. 2015, pp. 779-785, vol. 6 Issue 11.

Disclosed Anonymously, "Common Device Adaptor for different kind of tracking devices," An IP.com Prior Art Database Technical Disclosure, Jun. 2, 2019, 5 pages, IP.com No. IPCOM000258660D.

Watfa et al., "Method and System for Targeting Users Based on Detecting Interest of a User in Physical Products Using Item Tags," An IP.com Prior Art Database Technical Disclosure, Mar. 30, 2021, 6 pages, IP.com No. IPCOM000265334D.

Disclosed Anonymously, "NFC device tracker for low power or passive devices," An IP.com Prior Art Database Technical Disclosure, Mar. 8, 2018, 6 pages, IP.com No. IPCOM000253149D.

Majumder, A. et al.; "NFC in IoT-Based Payment Architecture," ResearchGate, Oct. 2017, 20 pages.

Fox News, "Wearable boarding pass now available for smartwatch owners", Travel Gear, Nov. 5, 2015, 6 pages.

International Search Report and Written Opinion for International Application No. PCT/EP2024/057863, Filed Mar. 22, 2024, Date of Mailing: Jun. 27, 2024, 12 pages.

Molen, "Android Wear review: Taking smartwatches in the right direction", Engadget, Jul. 3, 2014, 16 pages.

Zhu et al., "Demo: MPBond—Efficient Network-level Collaboration Among Personal Mobile Devices", MobiSys '20, Jun. 15-19, 2020, pp. 476-477.

* cited by examiner

CACHING A DATA PAYLOAD ON A PERIPHERAL DEVICE FOR DELIVERY TO A TARGET DEVICE

BACKGROUND

The present disclosure relates to mobile computing, and, more specifically, to caching data on a device.

Mobile computing comprises human-computer interaction in which a computing device can be transported during normal usage to allow for wireless transmission of data. Mobile computing involves mobile communication, mobile hardware, and mobile software and applications. Mobile communication is enabled by ad hoc networks and infrastructure networks, as well as communication properties, protocols, and data formats. Mobile hardware includes mobile devices (e.g., mobile phones, portable computers, wearable devices, etc.) and device components to enable mobile communication (e.g., wireless network hardware). Mobile software and applications handle the characteristics and requirements of mobile computing and communication.

SUMMARY

Aspects of the present disclosure are directed toward a computer-implemented method comprising receiving, at a peripheral device via a short-range wireless protocol, a data payload intended for a target device, where the data payload is received from a source device configured to send the data payload to the target device. The computer-implemented method further comprising storing the data payload in a memory of the peripheral device for a time that allows the peripheral device to be placed in network proximity of the target device and transfer the data payload from the peripheral device to the target device. The computer-implemented method further comprising detecting the target device via a short-range wireless network, and sending the data payload to the target device via a short-range wireless protocol used by the target device.

Additional aspects of the present disclosure are directed to systems and computer program products configured to perform the method described above. The present summary is not intended to illustrate each aspect of, every implementation of, and/or every embodiment of, the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
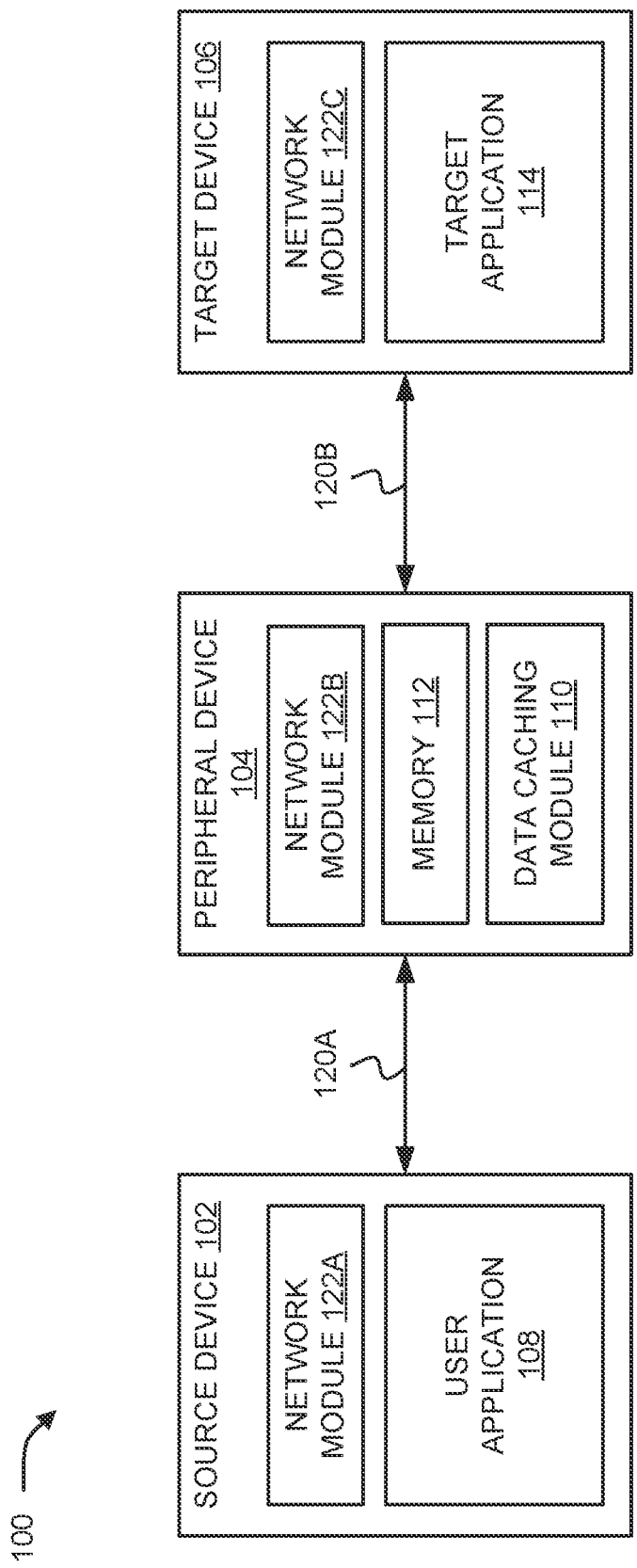
FIG. 1 is a block diagram illustrating an example system environment that can implement data caching on a peripheral device, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward caching a data payload, intended for a target device, on a peripheral device, such that the peripheral device can be used to deliver the data payload to the target device when placed in network proximity of the target device that allows transferring of the data payload via a short-range wireless protocol. While not limited to such applications, embodiments of the present disclosure may be better understood in light of the aforementioned context.

The rise of mobile computing has brought about wireless communication technologies that allow mobile devices to exchange data with other devices, such as end user devices, reader devices, and other mobile devices. For example, short-range wireless protocols, including near-field communication (NFC), radio frequency identification (RFID), ZigBee®, Bluetooth®, WI-FI®, WI-FI Direct®, and the like enable a source device (e.g., a mobile device) to exchange a data payload with a target device, such as an end user device, reader device, or another mobile device. As an illustration, a user can load an electronic boarding pass onto the user's mobile device, and at the time of boarding a plane, train, bus, etc., the user can present the electronic boarding pass by placing the mobile device in proximity of a reader device, which initiates a transfer of the electronic boarding pass to the reader device using a short-range wireless protocol.

However, in some instances using a source device to send a data payload (e.g., a boarding pass, a digital key, or other data) to a target device can be cumbersome. As one example, when traveling, a user may load an electronic boarding pass onto the user's mobile device and then store away the mobile device (e.g., in a backpack, carry-on bag, or even checked luggage) in order to free up the user's hands. Thereafter, when requested to present a boarding pass, the user's mobile device may be physically inaccessible or not readily accessible (e.g., stored in backpack, carry-on bag, or checked luggage) preventing or hampering the user from retrieving the mobile device and presenting the electronic boarding pass to a boarding pass reader device. As another example, a user may store a digital house key on the user's mobile device. When arriving home with a handful of items and the user's mobile device is stored away in the user's pocket, bag, or left behind in the user's vehicle, the user may be unable to immediately retrieve the mobile device and unlock the door using the digital house key.

Advantageously, aspects of the present disclosure overcome these challenges, and other challenges, by caching a data payload intended for a target device on a peripheral device, which can then be used to deliver the data payload to a target device. More specifically, aspects of the present disclosure allow a peripheral device to receive a data payload intended for a target device from a source device via a short-range wireless protocol. The data payload can be any type of data that is intended for the target device, such as an electronic ticket, security credential, digital key, etc. As a non-limiting example, a user can load an electronic boarding pass onto the user's mobile device (source device), and prior to storing away their mobile device (e.g., mobile device) in their luggage, the user places a peripheral device (e.g., wireless headphone, smartwatch, or the like) in network proximity of the mobile device, thereby initiating a transfer of the electronic boarding pass from the user's mobile device to the user's peripheral device using a short-range wireless protocol (e.g., NFC, RFID, ZigBee®, Bluetooth®, WI-FI®, WI-FI Direct®, etc.).

In response to the peripheral device receiving the data payload, aspects of the present disclosure can store, by the peripheral device, the data payload in a memory of the peripheral device for a time that allows the data payload to be transferred from the peripheral device to the target device. Continuing the non-limiting example above, after receiving the electronic boarding pass from the user's mobile device, the peripheral device caches the electronic boarding pass in the memory of the peripheral device. The electronic boarding pass can be cached on the peripheral device for an amount of time (e.g., 10, 20, 30, or 45 minutes) sufficient for the user to make their way to a checkpoint and present the boarding pass.

After storing the data payload on the peripheral device, the peripheral device can be used to deliver the data payload to the target device. More specifically, the peripheral device can be placed in network proximity to the target device, and in response, aspects of the present disclosure can send the data payload from the peripheral device to the target device using the same, or different, short-range wireless protocol. Continuing the non-limiting example above, upon making their way to the checkpoint, the user can place the peripheral device in proximity to a boarding pass reader device (target device) configured to read and validate electronic boarding passes. Placing the peripheral device next to the reader device may initiate a wireless transfer of the electronic boarding pass from the peripheral device to the reader device using a short-range wireless protocol (e.g., NFC, RFID, ZigBee®, Bluetooth®, WI-FI®, WI-FI Direct®, etc.).

Thus, as shown above, aspects of the present disclosure provide improvements in the area of device-to-device communications by configuring a peripheral device to deliver a data payload to an intended target device when a source device is not readily accessible. That is, aspects of the present disclosure address the network-centric challenge of transmitting a data payload to a target device when a source device is not accessible. These aspects that allow a peripheral device to receive a data payload from a source device, cache the data payload in memory of the peripheral device for a limited time, and deliver the data payload to the target device when the peripheral device is in network proximity to the target device are meaningful limitations rooted in computer technology. Moreover, enabling a peripheral device to deliver a data payload to an intended target device enhances the capabilities of the peripheral device to do something that it could not do before.

Referring now to the figures, FIG. 1 illustrates a block diagram of an example system environment 100 that can implement data caching on a peripheral device, in accordance with some embodiments of the present disclosure. As illustrated, the system environment 100 can include a source device 102, a peripheral device 104, and a target device 106, which are configured to communicate over one or more short-range wireless networks 120A and 120B (referred to collectively as 120).

The source device 102 comprises a processor-based system such as a computing device capable of exchanging data with other devices. In some embodiments, the source device 102 can be a mobile device (e.g., a mobile phone, mobile computer, tablet device, handheld game console, portable media player, and the like) that is capable of sending and receiving a data payload over a short-range wireless network 120. The source device 102 includes one or more network modules 122A that implement a short-range wireless protocol for communications over a short-range wireless network 120. Short-range wireless networks are computer networks that communicate over a short distance, typically within a few millimeters to a few meters. Common types of short-range wireless protocols include NFC, RFID, Bluetooth®, ZigBee®, WI-FI®, WI-FI Direct®, and similar network communication protocols. In some embodiments, the source device 102 may include a network module 122A capable of sending and receiving a data payload over other types of networks (e.g., local area network (LAN), wide area network (WAN), etc.) or a direct device-to-device wired connection (e.g., a plug and play interface that allows the source device 102 to directly connect to and communicate with the peripheral device 104).

The source device 102 hosts a user application 108 which, among other things, communicates with the target device 106 by sending a data payload to the target device 106. Illustratively, the user application 108 comprises a software application installed on the source device 102 and is designed to be used by a user to perform a specific task that involves sending a data payload to the target device 106. Non-limiting examples of user applications 108 include transportation applications (e.g., airline applications, train system applications, public bus applications, etc.), access control system applications (e.g., door access system applications, IoT smart lock applications, etc.), security system applications (e.g., authentication application for accessing a computer system), as well as other type of user applications designed to provide a data payload to the target device 106. The user application 108 interfaces with a network module 122A to send and receive data payloads.

In some embodiments, the user application 108 can be configured to identify the peripheral device 104 as an agent of the source device 102 to deliver a data payload to the target device 106. In other embodiments, the peripheral device 104 can mimic the target device 106, such that when the peripheral device 104 connects to the source device 102, the user application 108 on the source device 102 identifies the peripheral device 104 as the target device 106. For example, when connecting to the source device 102, a data caching module 110 (described below) on the peripheral device 104 can be configured to identify itself (i.e., the peripheral device 104) as the target device 106, such that the user application 108 on the source device 102 interacts with the data caching module 110 on the peripheral device 104 in the same way that it would interact with a target application 114 on the target device 106.

A data payload comprises any type of data capable of being transmitted over a computer network, from a simple message to a complex file. Illustratively, a data payload can comprise: a boarding pass that allows boarding of a form of public transportation, an electronic ticket for admission to an event or location, user credentials for accessing a restricted area of a building or accessing a computer system or unlocking an IoT lock device, transactional data, as well as any other type of data that can be presented to the target device 106. In some embodiments, a data payload can comprise an optical code or machine-readable symbol that is capable of being displayed and/or read by devices 102/104/106. Headers and metadata can be included with the data payload to enable delivery of the data payload to an intended target device 106.

The target device 106 comprises a processor-based system such as a computing device capable of receiving a data payload originating from the source device 102. In some embodiments, the target device 106 can be a reader device (e.g., NFC reader device, RFID reader, chip card reader, etc.), an optical reader device (quick response (QR) code scanner, bar code scanner, passport scanner, etc.), a mobile device capable of wirelessly receiving a data payload, and the like. The target device 106 includes a network module(s) 122C that implements a short-range wireless protocol for communications over a short-range wireless network 120. In some embodiments, a short-range wireless protocol used by the target device 106 can be the same short-range wireless protocol utilized by the source device 102 (e.g., both utilize NFC to send and receive data payloads). In other embodiments, as described in more detail below, the target device 106 and the source device 102 can utilize different short-range wireless protocols (e.g., the source device 102 uses a first short-range wireless protocol (e.g., Bluetooth®) to send and receive data payloads, and the target device 106 uses a second short-range wireless protocol (e.g., NFC) to send and receive data payloads).

The target device 106 can host a target application 114 or software program which, among other things, receives a data payload originating from a user application 108 on the source device 102 and performs a specific task related to the data payload. The target application 114 interfaces with a network module 122C to receive data payloads. Non-limiting examples of tasks performed by a target application 114 or software program include: boarding pass/ticket validation, building access validation (e.g., door access, IoT smart lock/unlock, etc.), security authentication (e.g., authentication for accessing a computer system), as well as other types of tasks related to a data payload originating from the source device 102. Alternatively, in some embodiments, a target application 114 can be hosted in a cloud environment. In such embodiments, the target device 106 acts as a client by receiving a data payload from the peripheral device 104 (as described in detail below), and then sending the data payload over a wide area network (WAN) to the target application 114 located in the cloud environment.

The peripheral device 104 comprises a processor-based system, such as a computing device, capable of hosting a data caching module 110. Non-limiting examples of peripheral devices 104 include: wireless headphones, a smartwatch, a smart ring, smart clothing, smart glasses, augmented reality (AR) and/or mixed reality glasses, a fitness tracker, as well as any other device capable of hosting the data caching module 110. In some embodiments, the peripheral device 104 can be manufactured to include the data caching module 110 that enables the peripheral device 104 to receive a data payload from the source device 102 and deliver the data payload to the target device 106. In other embodiments, the data caching module 110 (e.g., a data caching application or program) can be loaded/installed on the peripheral device 104 by a user to enable the peripheral device 104 to receive a data payload from the source device 102 and deliver the data payload to the target device 106.

The peripheral device 104 includes one or more network modules 122B to implement a short-range wireless protocol for communications over a short-range wireless network 120. As mentioned above, in some embodiments the peripheral device 104 can receive a data payload from the source device 102 using a first short-range wireless protocol (e.g., Bluetooth®), and then send the data payload to the target device 106 using a second short-range wireless protocol (e.g., NFC). In such embodiments, the peripheral device 104 can include a first network module 122B implementing the first short-range wireless protocol and a second network module 122B implementing the second short-range wireless protocol. In some embodiments, the peripheral device 104 can be an Internet connected device (e.g., an Internet of Things (IoT) device), and the source device 102 can send a data payload to the peripheral device 104 over the Internet.

The data caching module 110 enables the peripheral device 104 to act as an agent of the source device 102 to deliver a data payload to the target device 106. That is, in addition to the primary functionality of the peripheral device 104 (e.g., audio speaker, time display, fitness tracking, etc.), data caching module 110 enables the peripheral device 104 to provide the secondary functionality of delivering a data payload received from the source device 102 to the target device 106. In particular, the data caching module 110 receives from the source device 102 via a short-range wireless network 120A a data payload intended for the target device 106, and the data caching module 110 stores the data payload in a memory 112 of the peripheral device 104. Thereafter, when the peripheral device 104 is placed in network proximity of target device, the data caching module 110 sends, via a short-range wireless network 120B, the data payload to the target device 106. Network proximity, as referred to herein, is a distance between devices 102/104/106 that allows for communication over a wireless communication channel to transfer a data payload between the devices 102/104/106.

In some embodiments, in order to allow the peripheral device 104 to act as an agent of the source device 102 to deliver a data payload to the target device 106, a data caching mode of the peripheral device 104 is activated. Activating the data caching mode on the peripheral device 104 loads the data caching module 110 on the peripheral device's computing hardware for execution. Illustratively, activating the data caching mode can comprise: activating a dedicated hardware control of the peripheral device (e.g., pressing a button), overriding a hardware control (e.g., pressing a volume button a number of times or for a period of time to override a primary function of the button), activating an input element of a graphical user interface of the peripheral device 104 (e.g., a software button on a smartwatch interface), detecting by a microphone of the peripheral device 104 a user's spoken command (e.g., a user saying the phrase "turn on data caching mode"), receiving a signal from the source device 102 (e.g., via a short-range wireless network 120A), and the like. Activating the data caching mode on the peripheral device 104 causes the data caching module 110 to search for and/or connect to a nearby source device 102 and initiate a transfer of a data payload from the source device 102 to the peripheral device 104. In some examples, the peripheral device 104 may already be connected to source device 104 (e.g., source device 104 may be a paired device, as described below).

In other embodiments, the data caching mode on the peripheral device 104 is in a passive always on state, such that the data caching module 110 is loaded in memory 112 and executing on the peripheral device 104 as a background service. When the peripheral device 104 is placed in network proximity of the source device 102, the data caching module 110 detects the source device 102 (via the short-range wireless network 120A) and initiates a transfer of a data payload from the source device 102 to the peripheral device 104.

As described above, the data caching module 110 searches for a nearby source device 102 that the peripheral device 104 can connect to. In some embodiments, the data caching module 110 can search for a paired source device 102, with which the peripheral device 104 has been registered (e.g., paired). For example, the source device 102 and the peripheral device 104 can be paired devices, such that the source device 102 and the peripheral device 104 have completed a pairing process (e.g., a Bluetooth® pairing process) that registers the devices 102/104 with one another. Once registered, the devices 102/104 are trusted, and can exchange data without having to complete the pairing process again. For devices 102/104 that are paired, activating the data caching mode on the peripheral device 104 causes the data caching module 110 to establish a network connection (if not already connected) with the source device 102 and initiate a transfer of a data payload from the source device 102 to the peripheral device 104. In circumstances where the source device 102 and/or the peripheral device 104 are not trusted devices, aspects of the present disclosure can perform authentication and authorization to allow the devices 102/104 to connect to one another and exchange a data payload. Any authentication and authorization technique can be used to verify the identity of a device 102/104 and/or user, including: biometric authentication, voice authentication, personal identification number (PIN) authentication, token authentication, two-factor authentication (2FA), media access control (MAC) authentication, and other authentication methods.

In response to detecting a short-range wireless network 120A associated with source device 104, the data caching module 110 establishes a communication channel (which can include performing authentication and authorization if needed) with source device 104. The communication channel enables the data caching module 110 to communicate with a user application 108 hosted on the source device 102. Thereafter, the user application 108 on the source device 102 sends a data payload to the peripheral device 104 over the communication channel. Sending the data payload from the source device 102 to the peripheral device 104 comprises a data transfer over the communication channel, which can be implemented using a short-range wireless protocol (e.g., NFC, RFID, ZigBee®, Bluetooth®, WI-FI®, WI-FI Direct®, and the like). FIG. 1 illustrates that a short-range wireless network 120A is provided to enable communication between the source device 102 and the peripheral device 104. The short-range wireless network 120B can be implemented using any suitable short-range wireless protocol, or combination thereof, and the components utilized for the short-range wireless network 120A depend, at least in part, upon the type of wireless network and/or environment selected.

In response to receiving a data payload from the source device 102, the data caching module 110 stores the data payload in a memory 112 of the peripheral device 104 for a time that allows the data payload to be transferred from the peripheral device 104 to the target device 106. The time that the data payload is stored in memory 112 can be based on the context of the data payload. For example, if the data payload contains protected data (e.g., a passport, username and password, etc.), short-lived data (e.g., a 2-step verification code), or another type of data that should not be cached in memory for an extended amount of time, the data caching module 110 may delete the data payload from memory 112 after a short timeout period (e.g., 1-5 minutes). However, if the data payload contains non-sensitive data, or a user needs additional time to make their way to the target device 106, then the amount of time that the data payload is cached on the peripheral device 104 can be longer (e.g., 10 minutes, 30 minutes, 1 hour, etc.). In some embodiments, the data caching module 110 can estimate a timeout period for a data payload based on the context of the data payload (e.g., set an increased timeout period when a data payload is an airline boarding pass to allow a user to make their way from airport security to an airport gate, set a short timeout period when a data payload is a security key that unlocks a door). Accordingly, in some embodiments, when caching a data payload into memory 112, the data caching module 110 sets a timeout period for the data payload. If the data payload is not transferred to the target device 106 prior to the timeout period expiring, the data caching module 110 deletes the data payload from the memory 112 of the peripheral device 104.

In some embodiments, before deleting a data payload from the memory 112, the data caching module 110 can query a user whether they would like to extend the timeout period, thereby providing the user with additional time to make their way to the target device 106. As an example, if a user is navigating through a crowded airport terminal and the timeout period is about to expire, the data caching module 110 can query the user (e.g., via a speaker, graphical user interface, haptic interface, etc. of the peripheral device 104) whether they would like to extend the timeout period to allow the user to reach the target device 106 located at an airport gate. A time extension to the timeout period can be a fixed amount of time (e.g., 2 minutes, 5 minutes, etc.) that is applied by the data caching module 110, or a user can indicate an additional amount of time to apply to the timeout period (e.g., by inputting a customized amount of time or by selecting one of a plurality of time extensions provided by the data caching module 110).

As a non-limiting example that illustrates the concepts described above, FIG. 2 with continuing reference to FIG. 1 shows that, prior to boarding a form of public transportation that requires a boarding pass (e.g., an airplane, train, boat, etc.), a user 202 can cache a data payload comprising an electronic boarding pass on a peripheral headphone device 206. To cache the electronic boarding pass on the headphone device 206, the user 202 activates a data caching mode of the headphone device 206 (as described earlier) and places the headphone device 206 in network proximity of a source mobile device 204. When in network proximity of the mobile device 204, the data caching module 110 on the headphone device 206 detects the mobile device 204 via a short-range wireless network 120A (e.g., Bluetooth® or NFC network) associated with the mobile device 204 and connects to the source mobile device 204. In response, a user application 108 on the mobile device 204 initiates a transfer of the electronic boarding pass to the headphone device 206 and the data caching module 110 on the headphone device 206 caches the electronic boarding pass in a memory 112 of the headphone device 206. Thereafter, the user 202 can store away the mobile device 204 (e.g., in the user's bag 208) and place the peripheral headphone device 206 in an easily accessible location (e.g., the user's ear). The user 202 can then make their way to a location of a target boarding pass reader device 210. With the electronic boarding pass cached on the headphone device 206, the electronic boarding pass is readily accessible to the user 202 via the headphone device 206. As will be appreciated, the example shown in FIG. 2 and described above merely illustrates one implementation of aspects of the present disclosure and is not meant to be limiting in any way.

Returning again to FIG. 1, having cached a data payload in memory 112 of the peripheral device 104, the data caching module 110, in response to detecting the target device 106, transfers a data payload cached in memory 112 of the peripheral device 104 to the target device 106. In some embodiments, the peripheral device 104 searches for the target device 106 by scanning for a short-range wireless network 120B associated with the target device 106. In response to detecting a short-range wireless network 120B associated with the target device 106, the data caching module 110 establishes a communication channel with the target device 106 and sends a data payload cached in memory 112 to the target device 106, allowing the data payload to be provided to a target application 114 hosted on the target device 106 or in a cloud environment. Sending the data payload from the peripheral device 104 to the target device 106 comprises a data transfer over a communication channel implemented using a short-range wireless protocol (e.g., NFC, RFID, ZigBee®, Bluetooth®, WI-FI®, WI-FI Direct®, and the like). As illustrated, the short-range wireless network 120B is provided to enable communication between the peripheral device 104 and the target device 106. The short-range wireless network 120B can be implemented using any useful short-range wireless protocol, or combination thereof, and the components utilized for the short-range wireless network 120B depend, at least in part, upon the type of wireless network and/or environment selected. In some embodiments, the data caching module 110 detects a short-range wireless network 120B utilized by the target device 106 when the peripheral device 104 is in network proximity to the short-range wireless network 120B. In response to detecting the short-range wireless network 120B, the data caching module 110 establishes a communication channel with the target device 106, whereupon the data caching module 110 initiates sending of a data payload cached in memory 112 to the target device 106 over the communication channel.

Figure 2:
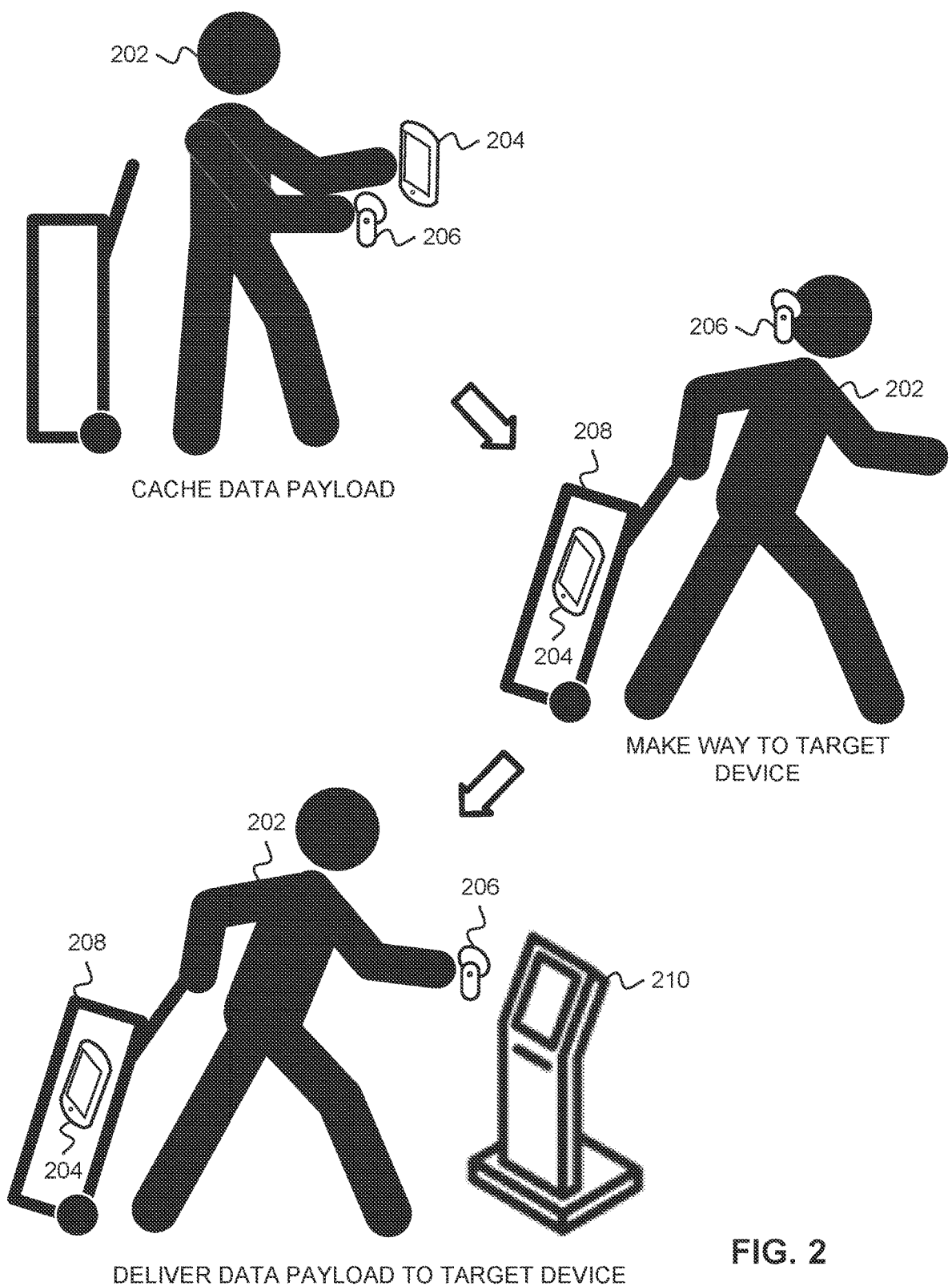
FIG. 2 illustrates an example use case of caching a data payload on a peripheral device for delivery to a target device, in accordance with some embodiments of the present disclosure.

Again, referring to the non-limiting example illustrated in FIG. 2 and with continuing reference to FIG. 1, when the user 202 reaches the target boarding pass reader device 210, the user 202 can retrieve the headphone device 206 (e.g., from the user's ear) and place the headphone device 206 near the boarding pass reader device 210. The data caching module 110 on the headphone device 206 detects a short-range wireless network (e.g., NFC) associated with the boarding pass reader device 210 and establishes a communication channel with the boarding pass reader device 210. Thereafter, the data caching module 110 initiates a transfer of the electronic boarding pass cached in the memory 112 of the headphone device 206 to the boarding pass reader device 210, which provides the electronic boarding pass to a passenger application configured to verify the electronic boarding pass. As stated earlier, the example shown in FIG. 2 and described above merely illustrates one implementation of aspects of the present disclosure and is not meant to be limiting in any way.

Returning to FIG. 1, in some embodiments, as part of exchanging a data payload with the target device 106, the data caching module 110 on the peripheral device 104 can receive an acknowledgement message from the target device 106 indicating that a data payload was successfully transferred to the target device 106. In response, the data caching module 110 can save the acknowledgement message (e.g., store the acknowledgement message in memory 112 of the peripheral device 104) so that the next time the peripheral device 104 connects to the source device 102, the data caching module 110 can provide the acknowledgement message to the user application 108 hosted on the source device 102, thereby providing evidence to the user application 108 that the data payload has been successfully delivered to the target device 106. Similarly, in the case that the data payload was not successfully delivered to the target device 106 (e.g., a timeout period expired and the data payload was deleted from the memory 112 of the peripheral device 104), the data caching module 110 can provide a negative-acknowledgement message to the user application 108 hosted on the source device 102 indicating that the data payload was not delivered to the target device 106. Accordingly, the user application 108 can maintain a record for the state of each data payload transfer from the source device 102 to the target device 106.

In the example described earlier where a data caching mode of the peripheral device 104 is activated to allow the peripheral device 104 to act as an agent of the source device 102 to deliver a data payload to the target device 106, after delivering the data payload to the target device 106, and optionally providing an acknowledgement or negative-acknowledgement message, the data caching mode can be deactivated using an action or method used to activate the data caching mode (e.g., activating a volume button of the peripheral device 104 a particular number of times or for a period of time, etc.). Also, in the example where a data caching mode of the peripheral device 104 is activated to allow the peripheral device 104 to act as an agent of the source device 102, in some embodiments, if the peripheral device 104 is unable to deliver a data payload to the target device 106 within a timeout period (described earlier), the data caching mode of the peripheral device 104 can automatically be deactivated after the timeout period expires.

Figure 4:
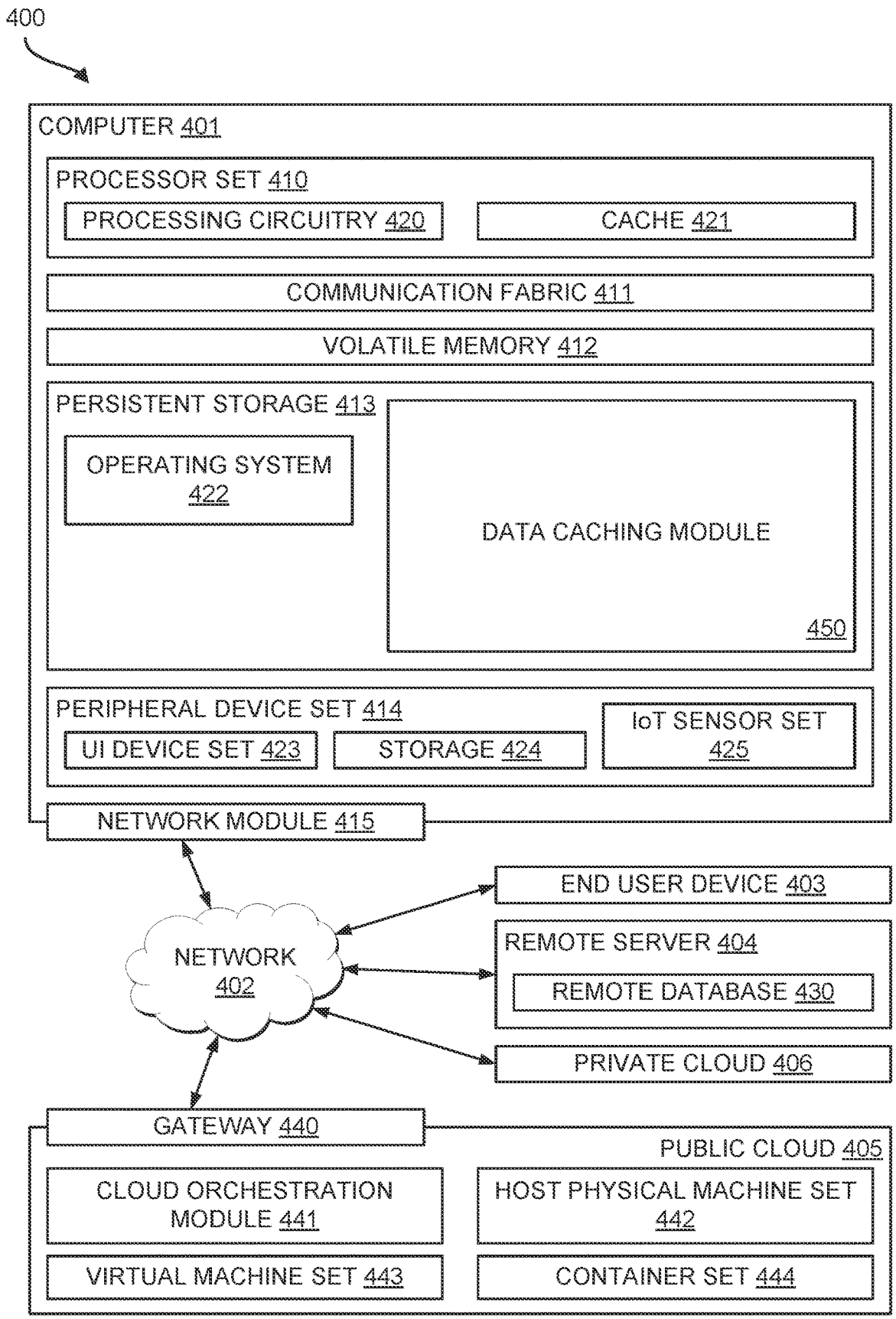
FIG. 4 is a block diagram that illustrates an example computing environment in which aspects of the present disclosure can be implemented, in accordance with some embodiments of the present disclosure.

In some embodiments, all or a portion of the system environment 100 in FIG. 1 can be implemented by components shown in computing environment 400 of FIG. 4. The data caching module 110 can be implemented in software, hardware, firmware or a combination thereof. When software is used, the operations performed by the data caching module 110 can be implemented in program instructions configured to run on hardware, such as one or more processors. When firmware is used, the operations performed by data caching module 110 can be implemented in program instructions and data and stored in persistent memory to run on a processor. When hardware is employed, the hardware can include circuits that operate to perform the operations of the data caching module 110. Moreover, the data caching module 110 on the peripheral device 104 can be configured to perform at least one of the steps, operations, or actions described in the different illustrative examples using software, hardware, firmware, or a combination thereof, and as a result, the peripheral device 104 operates as a special device on which the data caching module 110 enables caching and delivery of a data payload to the target device 106. In particular, the data caching module 110 transforms the peripheral device 104 into a special purpose device as compared to currently available general computer devices that do not have the data caching module 110.

While FIG. 1 illustrates an example of a system environment that can implement the techniques above, many other similar or different environments are possible. That is, the illustrated system environment 100 is not meant to imply physical or architectural limitations to the manner in which an illustrative embodiment can be implemented. Other components in addition to, or in place of, the ones illustrated may be used. Some components may be unnecessary. Also, the blocks are presented to illustrate some functional components. One or more of these blocks may be combined, divided, or combined and divided into different blocks when implemented in an illustrative embodiment. Accordingly, the example environments discussed and illustrated above are merely representative and are not meant to be limiting.

Figure 3:
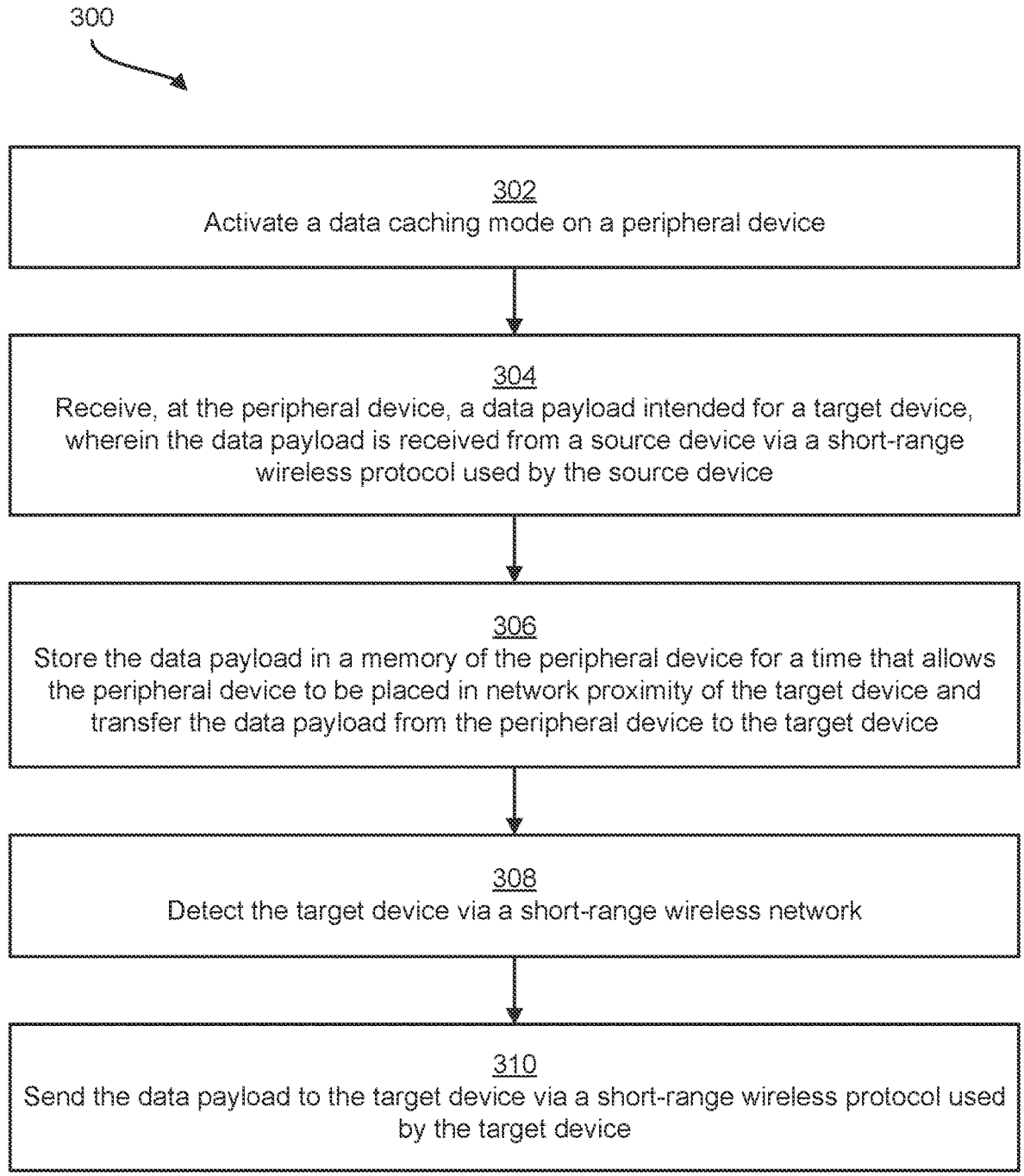
FIG. 3 is a flow diagram illustrating an example method for caching a data payload on a peripheral device to be delivered to a target device, in accordance with some embodiments of the present disclosure.

FIG. 3 is a flow diagram illustrating an example method 300 for caching a data payload on a peripheral device to be delivered to a target device, in accordance with some embodiments of the present disclosure. As described earlier, in the area of device-to-device communications, using a source device (e.g., a mobile device) to send a data payload to a target device (e.g., a boarding pass reader or an electronic ticket reader) can be cumbersome when the source device is not readily accessible. The method 300 provides improvements to peripheral device capabilities that address these and other issues associated with using a source device to send a data payload to a target device.

Starting with operation 302, the method 300 activates a data caching mode on a peripheral device. Activating the data caching mode enables the peripheral device to act as an agent of a source device to deliver a data payload to a target device, as described by the operations below. Illustratively, activating the data caching mode on the peripheral device can comprise an action selected from a group consisting of: detecting a vocal indication by a microphone of the peripheral device, activating a hardware control of the peripheral device, activating an input element of a graphical user interface of the peripheral device, and receiving an activation signal transmitted by the source device (e.g., an instruction sent via a short-range wireless protocol that instructs the peripheral device to activate the data caching mode). In some embodiments, the data caching mode on the peripheral device can be in a passive always on state, such that when the peripheral device is placed in network proximity of source device, the peripheral device detects source device and initiates a transfer of a data payload from the source device to the peripheral device.

In operation 304, the peripheral device receives, from the source device via a short-range wireless network, a data payload intended for a target device. In some embodiments, the source device may be unaware that the source device is communicating with the peripheral device and not the target device. That is, when connecting to the peripheral device, and transmitting a data payload to the peripheral device, the source device may identify the peripheral device as a target device. In other embodiments, the source device may be configured to identify the peripheral device as an agent of the source device to deliver a data payload to the target device.

In some embodiments, receiving a data payload from the source device can include authenticating and authorizing transfer of the data payload from the source device to the peripheral device. For example, authentication and authorization can be performed by one or both of the source device and peripheral device to allow an exchange of the data payload. Any authentication and authorization technique can be used to verify the identity of a source device, peripheral device, and/or a user.

In operation 306, the peripheral device stores the data payload in a memory of the peripheral device for a time that allows the peripheral device to be placed in network proximity of the target device and transfer the data payload from the peripheral device to the target device. In some embodiments, storing the data payload in the memory of the peripheral device initiates a timeout for transferring the data payload to the target device. If the data payload is not transferred to the target device before the timeout period expires, the data payload is deleted from the memory of the peripheral device. In some embodiments, the timeout period can be set based on the context of the data payload, such that a timeout period for caching sensitive data on the peripheral device may be shorter as compared to a timeout period for caching non-sensitive data on the peripheral device.

In operation 308, the peripheral device detects the target device via a short-range wireless network. For example, the peripheral device can scan radio frequencies for a short-range wireless network associated with the target device. In response to detecting a short-range wireless network associated with the target device, the peripheral device can establish a communication channel with the target device that enables sending of the data payload to the target device. Thereafter, in operation 310, the peripheral device sends the data payload to the target device via a short-range wireless protocol used by the target device. In some embodiments, the peripheral device can send the data payload to the target device using a different short-range wireless protocol from what was used to receive the data payload from the source device. For example, a first transfer that sends the data payload from the source device to the peripheral device can use a first short-range wireless protocol, and a second transfer that sends the data payload from the peripheral device to the target device can use a second short-range wireless protocol.

In some embodiments, sending the data payload to the target device includes receiving, by the peripheral device, a message from the target device indicating that the data payload was successfully received by the target device. The peripheral device stores the message confirming successful delivery of the data payload to the target device, and some time thereafter, the peripheral device sends the message to the source device, indicating to the source device that the data payload was successfully received by the target device.

The method 300 described above can be performed by a computing device (e.g., aspects of computer 401 in FIG. 4), and/or generally can be implemented in fixed-functionality hardware, configurable logic, logic instructions, etc., or any combination thereof. In some alternative implementations, the operations described in the blocks of FIG. 3 can occur out of the order shown. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 400 contains an example of an environment for the execution of at least some of the computer code involved in performing the disclosed methods, such as block 450 that contains computer code for the data caching module described earlier. In addition to block 450, computing environment 400 includes, for example, computer 401, network 402 (e.g., wide area network (WAN), short-range wireless network, etc.), end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and block 450, as identified above), peripheral device set 414 (including user interface (UI), device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

COMPUTER 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

PROCESSOR SET 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 421 and the other storage media discussed below. The computer readable program instructions, and associated data, are accessed by processor set 410 to control and direct performance of the disclosed methods. In computing environment 400, at least some of the instructions for performing the disclosed methods may be stored in block 450 in persistent storage 413.

COMMUNICATION FABRIC 411 is the signal conduction paths that allow the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 412 is any type of volatile memory now known or to be developed in the future. Examples include dynamic type random access memory (RAM) or static type RAM. Typically, the volatile memory is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

PERSISTENT STORAGE 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid-state storage devices. Operating system 422 may take several forms, such as various known proprietary operating systems or open-source Portable Operating System Interface type operating systems that employ a kernel. The code included in block 450 typically includes at least some of the computer code involved in performing the disclosed methods.

PERIPHERAL DEVICE SET 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

NETWORK MODULE 415 is the collection of computer software, hardware, and firmware that allows computer 401 to communicate with other computers through network 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the disclosed methods can typically be downloaded to computer 401 from an external computer or external storage device through a network adapter card or network interface included in network module 415.

NETWORK 402 is any computer network, including short-range wireless networks, WANs (for example, the internet), and LANS, capable of communicating computer data over distances by any technology for communicating computer data, now known or to be developed in the future. In some embodiments, a WAN may be replaced and/or supplemented by local area networks (LANs) designed to communicate data between devices located in a local area, such as a WI-FI® network. The WAN and/or LANs typically include computer hardware such as copper transmission cables, optical transmission fibers, wireless transmission, routers, firewalls, switches, gateway computers, and edge servers.

END USER DEVICE (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

REMOTE SERVER 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

PUBLIC CLOUD 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. The terms "comprises," "comprising," "includes," "including," "has," "having," "contains" or "containing," or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. The term "user" refers to an entity (e.g., an individual(s), a computer, or an application executing on a computer). It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A computer-implemented method comprising:
   receiving, at a peripheral device via a short-range wireless protocol, a data payload intended for a target device, wherein the data payload is received from a source device capable of delivering the data payload directly to the target device, and the peripheral device acts as an agent of the source device to deliver the data payload to the target device;
   storing the data payload in a memory of the peripheral device for a time that allows the peripheral device to be placed in network proximity of the target device and transfer the data payload from the peripheral device to the target device;
   detecting the target device via a short-range wireless network, and
   sending the data payload to the target device via a short-range wireless protocol used by the target device.

2. The computer-implemented method of claim 1, further comprising activating a data caching mode on the peripheral device to enable the peripheral device to:
   detect the source device and establish network communication with the source device and receive the data payload from the source device, and
   detect the target device and establish network communication with the target device and send the data payload to the target device.

3. The computer-implemented method of claim 2, wherein activating the data caching mode on the peripheral device further comprises an action selected from a group consisting of:
   detecting a vocal indication by a microphone of the peripheral device,
   activating a hardware control of the peripheral device,
   activating an input element of a graphical user interface of the peripheral device, and
   receiving an activation signal transmitted by the source device.

4. The computer-implemented method of claim 1, wherein receiving the data payload from the source device further comprises authenticating and authorizing transfer of the data payload from the source device to the peripheral device.

5. The computer-implemented method of claim 1, wherein storing the data payload in the memory of the peripheral device further comprises initiating a timeout for transferring the data payload to the target device.

6. The computer-implemented method of claim 1, wherein sending the data payload to the target device further comprises:
receiving, by the peripheral device, a message from the target device indicating that the data payload was successfully received by the target device; and
sending the message, by the peripheral device, to the source device indicating that the data payload was successfully received by the target device.

7. The computer-implemented method of claim 1, wherein:
a first transfer comprising sending the data payload from the source device to the peripheral device uses a first short-range wireless protocol, and
a second transfer comprising sending the data payload from the peripheral device to the target device uses a second short-range wireless protocol.

8. A peripheral device comprising:
at least one short-range wireless module;
one or more computer readable storage media storing program instructions and one or more processors which, in response to executing the program instructions, are configured to:
receive, via a short-range wireless protocol, a data payload intended for a target device, wherein the data payload is received from a source device capable of delivering the data payload directly to the target device, and the peripheral device acts as an agent of the source device to deliver the data payload to the target device;
store the data payload in a memory of the peripheral device for a time that allows the peripheral device to be placed in network proximity of the target device and transfer the data payload from the peripheral device to the target device;
detect the target device via a short-range wireless network, and
send the data payload to the target device via a short-range wireless protocol used by the target device.

9. The peripheral device of claim 8, wherein the program instructions are further configured to cause the one or more processors to activate a data caching mode on the peripheral device to enable the peripheral device to:
detect the source device and establish network communication with the source device and receive the data payload from the source device, and
detect the target device and establish network communication with the target device and send the data payload to the target device.

10. The peripheral device of claim 9, wherein the program instructions configured to cause the one or more processors to activate the data caching mode on the peripheral device are further configured to cause the one or more processors to activate the data caching mode in response to an action selected from a group consisting of:
detecting a vocal indication by a microphone of the peripheral device,
activating a hardware control of the peripheral device,
activating an input element of a graphical user interface of the peripheral device, and
receiving an activation signal transmitted by the source device.

11. The peripheral device of claim 8, wherein the program instructions configured to cause the one or more processors to receive the data payload from the source device are further configured to cause the one or more processors to:
authenticate and authorize transfer of the data payload from the source device to the peripheral device.

12. The peripheral device of claim 8, wherein the program instructions configured to cause the one or more processors to store the data payload in the memory of the peripheral device are further configured to cause the one or more processors to:
initiate a timeout for transferring the data payload to the target device.

13. The peripheral device of claim 8, wherein the program instructions configured to cause the one or more processors to send the data payload to the target device are further configured to cause the one or more processors to:
receive a message from the target device indicating that the data payload was successfully received by the target device; and
send the message to the source device indicating that the data payload was successfully received by the target device.

14. The peripheral device of claim 8, wherein the program instructions are further configured to cause the one or more processors to:
receive the data payload from the source device using a first short-range wireless protocol, and
send the data payload to the target device using a second short-range wireless protocol.

15. A computer program product comprising:
one or more computer readable storage media, and program instructions collectively stored on the one or more computer readable storage media, the program instructions configured to cause one or more processors to:
receive, at a peripheral device via a short-range wireless protocol, a data payload intended for a target device, wherein the data payload is received from a source device capable of delivering the data payload directly to the target device, and the peripheral device acts as an agent of the source device to deliver the data payload to the target device;
store the data payload in a memory of the peripheral device for a time that allows the peripheral device to be placed in network proximity of the target device and transfer the data payload from the peripheral device to the target device;
detect the target device via a short-range wireless network, and
send the data payload to the target device via a short-range wireless protocol used by the target device.

16. The computer program product of claim 15, wherein the program instructions are further configured to cause the one or more processors to activate a data caching mode on the peripheral device to enable the peripheral device to:
detect the source device and establish network communication with the source device and receive the data payload from the source device, and
detect the target device and establish network communication with the target device and send the data payload to the target device.

17. The computer program product of claim 16, wherein the program instructions configured to cause the one or more processors to activate the data caching mode on the peripheral device are further configured to cause the one or more processors to activate the data caching mode in response to an action selected from a group consisting of:
- detecting a vocal indication by a microphone of the peripheral device,
- activating a hardware control of the peripheral device,
- activating an input element of a graphical user interface of the peripheral device, and
- receiving an activation signal transmitted by the source device.

18. The computer program product of claim 15, wherein the program instructions configured to cause the one or more processors to receive the data payload from the source device are further configured to cause the one or more processors to:
- authenticate and authorize transfer of the data payload from the source device to the peripheral device.

19. The computer program product of claim 15, wherein the program instructions configured to cause the one or more processors to store the data payload in the memory of the peripheral device are further configured to cause the one or more processors to:
- initiate a timeout for transferring the data payload to the target device.

20. The computer program product of claim 15, wherein the program instructions configured to cause the one or more processors to send the data payload to the target device are further configured to cause the one or more processors to:
- receive a message from the target device indicating that the data payload was successfully received by the target device; and
- send the message to the source device indicating that the data payload was successfully received by the target device.

* * * * *